United States Patent [19]

Goldstein

[11] 4,341,992
[45] Jul. 27, 1982

[54] CONDUCTIVE PROBE COVER

[75] Inventor: Harold Goldstein, Westbury, N.Y.

[73] Assignee: Control Electronics Co., Inc., Farmingdale, N.Y.

[21] Appl. No.: 113,508

[22] Filed: Jan. 21, 1980

[51] Int. Cl.³ ............................ G01R 31/02; G01K 7/22
[52] U.S. Cl. ...................................... 324/65 R; 324/51; 361/212; 374/158
[58] Field of Search ............... 73/362 AR; 206/306; 361/212; 324/53, 65 P

[56] References Cited

U.S. PATENT DOCUMENTS

| | | | |
|---|---|---|---|
| 902,753 | 11/1908 | Marshall | 324/65 P X |
| 2,475,356 | 7/1949 | Meschter | 361/212 |
| 3,192,474 | 6/1965 | Cherry | 324/65 X |
| 3,254,533 | 6/1966 | Tongret | 206/306 X |
| 3,367,186 | 2/1968 | Ensign et al. | 206/306 X |
| 3,461,724 | 8/1969 | Tong et al. | 73/362 AR |
| 3,650,153 | 3/1972 | Schwab | 73/343 R |
| 3,677,680 | 8/1972 | Etherington | 425/129 |
| 3,681,991 | 8/1972 | Eberly, Jr. | 73/362 AR |
| 3,719,576 | 3/1973 | Macur | 324/51 |
| 3,738,172 | 6/1973 | Sato | 136/221 X |
| 3,738,479 | 6/1973 | Sato | 73/362 AR |
| 3,822,593 | 7/1974 | Oudewaal | 206/306 X |
| 3,905,232 | 9/1975 | Knute | 73/362 AR |
| 3,929,018 | 12/1975 | Turner | 73/362 AR X |
| 3,978,325 | 8/1976 | Goldstein et al. | 73/359 X |
| 3,987,899 | 10/1976 | Vyprachticky | 73/362 AR |
| 3,999,434 | 12/1976 | Yen | 73/343 R |
| 4,007,832 | 2/1977 | Paull et al. | 73/362 AR |
| 4,008,614 | 2/1977 | Turner et al. | 73/343 R |
| 4,022,063 | 5/1977 | West et al. | 338/28 X |
| 4,068,526 | 1/1978 | Goldstein | 73/362 AR X |
| 4,095,467 | 6/1978 | McGlynn | 73/362 AR |
| 4,117,926 | 10/1978 | Turner et al. | 73/343 BX |
| 4,166,389 | 9/1979 | Montren | 73/343 R |
| 4,169,243 | 9/1979 | Payne et al. | 73/362 AR X |
| 4,231,901 | 11/1980 | Berbeco | 361/212 X |

Primary Examiner—Daniel M. Yasich
Attorney, Agent, or Firm—Bauer & Amer

[57] ABSTRACT

Several improvements are disclosed for the design of a protective cover for the probe component of an electronic thermometer. In one embodiment, the probe cover is formed of a thin layer of synthetic resin material having a conductive material dispersed therein to render the cover electrically conductive. A verification circuit in the electronic thermometer utilizes the conductivity of the cover to ascertain that the probe cover is properly positioned on the probe. In one embodiment, the resistance of the probe cover is measured along its length, and the verification circuit includes an enabling circuit to allow the thermometer to operate only if the measured resistance is between predetermined upper and lower ohmic limits. In another embodiment of the present invention, the probe cover retainer element is split into two conductive portions, and the resistance of the probe cover bridging those two portions is measured to ascertain that the probe cover is properly positioned on the probe. In each of these embodiments, the conductive probe cover is electrically grounded to provide for the discharge of static electrical charges from the conductive cover. In another disclosed embodiment of the present invention, a ring of reinforcing material is provided around the opening of the probe cover to provide for the secure retention of the cover on the probe.

19 Claims, 6 Drawing Figures

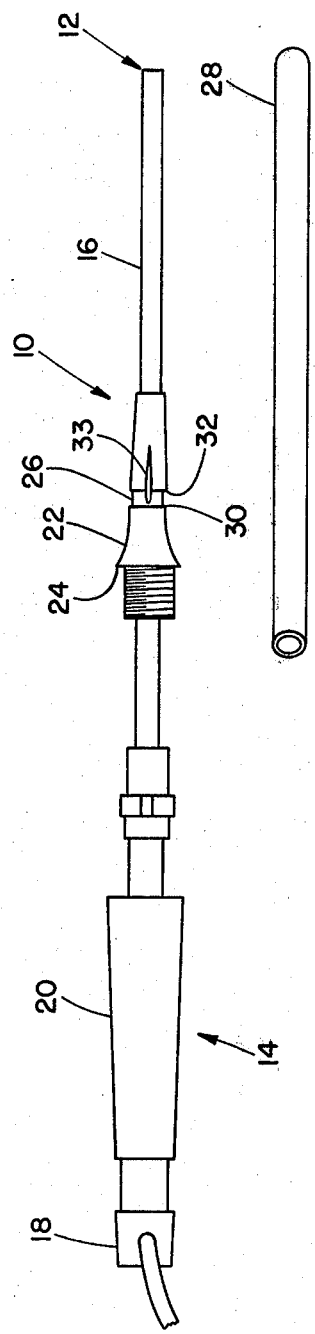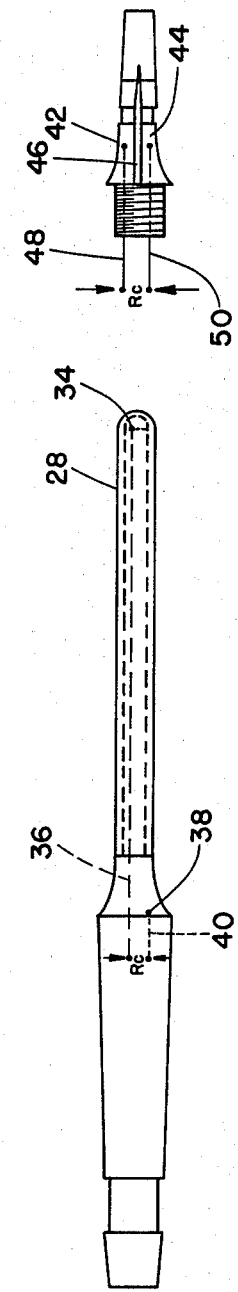
FIG. 1
FIG. 3
FIG. 4

CONDUCTIVE PROBE COVER

BACKGROUND OF THE INVENTION

1. Field of the Invention

The present invention relates generally to a probe cover for a probe component of an electronic thermometer.

Electronic thermometers have become useful and cost effective instruments in both human and veterinary medicine. Thermometers of this class usually include a probe member which is inserted into a cavity of a patient for taking a temperature measurement. A temperature sensing thermistor is normally provided at the sensing end of the probe, and is generally a permanent component of an electronic circuit in the thermometer. Disposable probe covers are often used with an electronic thermometer to bacteriologically isolate the probe from a patient while providing thermal contact with the body to enable the temperature to be sensed by the instrument. The use of a disposable probe cover readily facilitates the availability of a sanitary probe and cover for each new patient while eliminating the necessity for sterilization of the probe after each usage.

More particularly, the present invention pertains to an improved electronic thermometer probe cover which is designed to ensure that the cover is properly positioned on the probe before allowing a temperature measurement to be taken. Additionally, the cover provides for the discharge of any static charge which may accumulate thereon, an important consideration in some environments such as operating rooms.

2. Discussion of the Prior Art

Probe covers have generally been designed to conform to the shape of the probe with which they are to be utilized. For the most part, probe shafts are cylindrically shaped, and, accordingly, many probe covers have cylindrical configurations. The cylindrical configurations may include either straight walls, or tapered walls, or walls which taper to varying diameters through several sections.

For many applications it is desirable to have a probe cover formed of a rigid or semi-rigid material, normally a thermoplastic substance. A thermoplastic probe cover provides a sufficiently rigid structure to protect the mechanical components of the probe while maintaining sufficient flexibility to accommodate a patient's comfort.

Some thermoplastic probe covers in the prior art are provided with a metal tip at the sensing end thereof to provide improved thermal conductivity to the thermistor enclosed by the cover. Turner U.S. Pat. No. 4,117,926 utilizes an approach of this nature wherein a protective probe cover for an electronic thermometer has an elongated shaft or sleeve member formed of plastic which is provided with a metallic cap member at its sensing end.

Paull U.S. Pat. No. 4,007,832 illustrates a probe cover for an electronic thermometer which is formed of aluminum in a stepped diameter design. The aluminum cover is disclosed as providing a fast thermal response, while being comparatively economical to manufacture and utilize. Although this probe cover is electrically conductive, it is relatively rigid and is not formed of a flexible conductive plastic. Also it is not designed to be utilized with a verification circuit to ascertain that the disposable cover is properly positioned on the probe. Furthermore, the probe of Paull does not provide a grounding electrical contact for the probe, and accordingly even though the cover is conductive, the combination of the probe and cover would not provide for the discharge of static electrical charges from the aluminum cover.

Tong et al. U.S. Pat. No. 3,461,724 discloses a unique design for a probe cover for an electronic thermometer wherein the cover is a generally elongated hollow boot of a highly thermal conductive material such as aluminum foil. This probe cover is formed of aluminum foil because of its excellent heat conducting characteristics, and one skilled in this art would not be led by this patent to design a probe cover of a flexible conductive plastic. Furthermore, the aluminum foil probe is not designed to be utilized with a verification circuit to ascertain that the disposable cover is properly positioned on the probe. Although Tong et al. discloses an aluminum foil probe cover, the disclosed probe does not provide an electrical grounding contact for the cover, and accordingly the combination of the probe and cover would not provide for the discharge of static electricity from the foil cover.

Goldstein et al. U.S. Pat. No. 3,978,325 and Goldstein U.S. Pat. No. 4,068,526 disclose electronic thermometers of the type contemplated for usage with the teachings of the present invention. In greater particularity these patents disclose an electronic thermometer which provides an accurate final temperature reading prior to the actual stabilization of the temperature sensor. An algorithm is provided which allows taking only two sensor temperature measurements at preselected times to accurately predict the sensor final or stabilization temperature. Temperature resistance varying signals are converted to temperature-frequency varying signals, clocked into an up/down counter, to compute final temperature which is displayed digitally. A thirty-second timing sequence is also digitally displayed for use when the invention is utilized for medical applications.

Furthermore, Montren U.S. Pat. No. 4,166,389 discloses an electronic thermometer probe assembly which is suitable as a starting point for a redesigned probe assembly as disclosed herein. More particularly, Montren discloses a probe assembly designed to provide an instrument which is highly accurate and convenient to use. The thermometer includes a probe section having a flexible plastic shaft with a thermistor mounted at its tip. A disposable probe sheath covers the thermistor and flexible shaft, and is replaced after each measurement to ensure that the instrument remains uncontaminated. The sheath is cylindrically shaped, and has an open end which extends onto a conically-shaped retainer for the sheath. The thermometer handle includes an axially displaceable section, movement of which dislodges the sheath from the retainer to enable it to be disposed of conveniently.

SUMMARY OF THE INVENTION

In accordance with one aspect of the present invention, an improved design is disclosed for a protective cover for a probe of an electronic thermometer. The improved design ensures that the cover is properly fitted over the probe prior to operation of the electronic thermometer. A verification circuit in the thermometer functions to electrically ascertain that the cover is properly fitted onto the probe. The verification circuit electrically contacts the probe cover and measures its resistance along a given conductive path to determine that the probe cover is properly positioned on the probe. In one preferred embodiment, the probe cover is formed of a relatively thin layer of synthetic resin material having a conductive material therein to render the cover electrically conductive. Furthermore, the conductive material may be added to the synthetic resin in a predetermined density to provide a predetermined resistance in the cover.

In accordance with another aspect of the present invention, a ring of reinforcing material may be provided encircling the opening of the probe cover to provide for a more secure retention of the cover in a proper position on the probe. In one particular embodiment of the present invention, an annular ring of metal is provided around the probe cover opening.

In accordance with yet another aspect of the present invention, a probe cover of the type described herein is adapted to be utilized with an electronic thermometer having a verification circuit which enables operation of the thermometer only when a cover is properly positioned over the probe. The verification circuit electrically contacts the probe cover to check its resistance along a given conductive path, and enables operation of the thermometer only when the measured resistance is below a predetermined ohmic value. In accordance with one particular embodiment of the electronic thermometer, the verification circuit includes a first cover contact at the sensing end of the probe and a second cover contact at the probe cover opening, such that the measured resistive path is along the length of the cover. The magnitude of the resistance along the length of the probe cover is measured, and in accordance with another embodiment, operation of the electronic thermometer is enabled only if the magnitude of the measured resistance is between predetermined upper and lower ohmic limits.

In accordance with yet another aspect of the present invention, an electrically conductive probe cover is contacted with a grounding electrical contact for discharging static electricity therefrom, a concern in given environments such as in a hospital operating room.

Accordingly, a primary object of the present invention is the provision of an improved electrically conductive probe cover. Another object of the present invention is the provision of an improved electronic thermometer for use with a conductive probe cover including a verification circuit which enables operation of the thermometer only when a conductive probe cover is properly positioned over the probe. In accordance with the teachings herein, the verification circuit measures the resistance of the probe cover along a given resistive path, and enables operation of the electronic thermometer only when the measured resistance is between predetermined upper and lower ohmic limits.

BRIEF DESCRIPTION OF THE DRAWINGS

The foregoing and other objects and advantages of novel electronic thermometers and probe covers constructed pursuant to the teachings of the present invention may be more readily understood by one skilled in the art having reference to the following detailed description of several preferred embodiments thereof, taken in conjunction with the accompanying drawings wherein identical reference numerals are utilized to refer to like elements throughout the several views, and in which:

FIG. 1 is a side view of a partially disassembled probe member illustrating the relationship of several of the major components thereof;

FIG. 3 illustrates a probe cover properly positioned over a probe member, and shows an instrument having electrical contacts provided at both ends of the probe cover to measure its resistance along its length;

FIG. 4 is a side view of a probe cover retainer element which is designed to measure the resistance of the probe cover between two electrically conductive portions of the retainer;

DETAILED DESCRIPTION OF THE DRAWINGS

Figure 2:
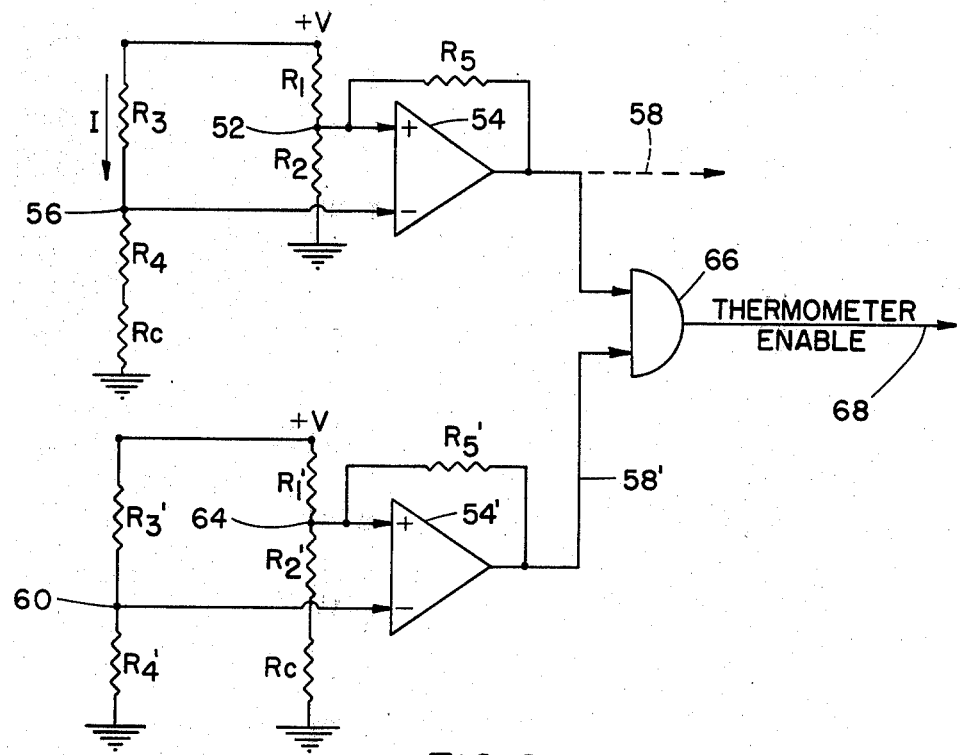
FIG. 2 is a schematic diagram of a verification circuit for an electronic thermometer which measures the resistance of a resistive path in a probe cover to ascertain that it is between predetermined upper and lower ohmic limits prior to enabling operation of the thermometer.

Referring now in detail to the drawings, a partially disassembled electronic thermometer probe assembly 10, which may be constructed pursuant to the teachings of Montren U.S. Pat. No. 4,166,389, includes a sensing end 12 and a handle end 14. The sensing end 12 is adapted to be inserted into an oral or rectal cavity of a patient while the handle end 14 of the instrument is grasped by the person taking the temperature measurement. Typically, a thermistor bead is mounted at the sensing end 12 of the instrument within a flexible hollow shaft 16 which extends the length of the assembly. The hollow shaft may be formed of a flexible nylon material, and its external diameter is approximately 0.1 inch. Two electrical wires connected to the thermistor bead extend through shaft 16, and lead back to the handle end of the instrument. A layer of silver epoxy glue may be provided around the thermistor bead to secure the latter in place at the sensing end 12 of shaft 16. Silver epoxy glue is commercially available, has a high thermal conductivity which results in imparting an efficient degree of heat transfer to the thermistor, and is also electrically conductive. The electrical leads to the thermistor may be coated with plastic in the region of the silver epoxy cement to prevent being shorted thereby.

The handle of the instrument includes a relatively fixed section 18 and an axially movable (relative to fixed section 18) section 20. A cover retainer element 22, having a generally conically shaped external surface is provided near the instrument sensing end of the handle to secure a probe cover in place over probe shaft 16. External threads at one end of retainer element 22 are adapted to threadedly engage internal threads in axially movable handle section 20, such that handle section 20 and cover retainer 22 are axially movable as a unit relative to shaft 16.

The external surface of retainer element 22 is generally frustoconical in shape, with the base portion flaring outwardly at 24 to approximately the same diametrical dimension as that of the end of movable handle element 20 to which it is attached. A smaller diameter cylindrical surface or annular recess 26 is formed along a portion of the length of the retainer element 22, at a precise axial location determined by the length of a disposable cover or sheath 28 and the dimensions of the instrument. The formation of cylindrical surface or recess 26 in the curved outer surface results in the formation of an annular shoulder 30 at one end of the cylindrical surface 26 and a circular lip 32 at the other end of the surface. The annular shoulder 30 serves to precisely axially position a disposable cover 28 placed over the flexible shaft 16 and moved into abutment with shoulder 30. The circular lip 32 has an external diameter slightly larger than the internal diameter of a disposable cover 28 so as to securely grip the cover in its proper position. The disposable cover 28 is formed of flexible plastic so as to be readily resiliently deformable to allow movement over the lip 32. Two axially extending shallow notches 33 are formed on opposite sides of the outer surface of retainer element 22, and extend across lip 32. These notches function to allow air to be evacuated or expelled from the interior of a cover 28 as the latter is being placed over the retainer element 22. In one embodiment, the retainer element is constructed of aluminum, however, it is apparent that it may be formed of other suitable materials.

A disposable cover 28 is properly positioned on the electronic thermometer assembly by means of the following procedure. After removal of a used cover, the movable handle portion 20 is located in a position where it abuts against the stationary handle portion 18. With the assembly in this position, the movable handle portion is then grasped, and the flexible shaft 16 is inserted into a new cover 28 in a manner whereby the thermistor is located towards the interior of the closed end of the cover. Further pushing against the handle 20 moves the open end of the cover over circular lip 32 so as to bear against annular shoulder 30. The flexible shaft 16 is now in compression because of the resilient natures of the sheath and the shaft, to thusly force the thermistor end of the shaft into intimate contact with the closed end of the cover and to ensure good conduction of heat through the cover 28 to the thermistor. After the temperature of the patient has been taken, the used cover is detached from the instrument by pushing the movable handle portion 20 and cap portion 18 of the handle together, which places the flexible shaft into greater compression and causes it to slightly flex. Further pushing together of the handle portions causes the bent shaft to "pop" the sheath or cover off the retainer member with a slight axial projection or ejecting action which allows the used cover to be disposed of conveniently by inverting the instrument downwardly over a disposal receptacle.

From the above-described operation, it is apparent that when a cover 28 is properly positioned over shaft 16 and retainer 22, the cover is under a slight tensile force between the silver epoxied sensing end of shaft 12 and the aluminum retainer 22.

In accordance with the teachings of the present invention, disposable cover 28 is formed of a synthetic resin having a conductive material therein to render the cover conductive with a given electrical resistance between its ends. If a cover is properly positioned on the instrument, then that resistance may be measured by providing a first electrical contact at 34 with the conductive silver epoxy end of the shaft 12 and a conductor 36 and a second electrical contact at 38 with the conductive aluminum retainer 24 and a conductor 40. This arrangement provides access across conductors 36 and 40 to the conductive path along the length of the cover, by which the electrical resistance $R_c$ of the cover along its length may be measured, as indicated in FIG. 3.

In an alternative embodiment illustrated in FIG. 4, the main body of the cover retainer element may be formed of a nonconductive material such as plastic. Two conductive metal portions 42 and 44 are separated by two axially extending nonconductive slits 46 on opposite sides of the retainer. Conductors 48 and 50 contact the metal portions 42 and 44, such that when a conductive probe cover is positioned on the retainer element, it bridges the metal portions 42 and 44, and the bridging resistance of the cover may be measured across conductors 48 and 50.

The verification circuit illustrated in FIG. 2 (which, for example, may be used in conjunction with the temperature sensing circuitry of the above mentioned Goldstein patents) measures the resistance $R_c$ of a selected resistive path in the probe cover. In this circuit resistors $R_1$ and $R_2$ are connected in a voltage divider network between a voltage source $+V$ and ground. Likewise, resistors $R_3$ and $R_4+R_c$ (the measured resistance of the probe cover) are also connected in a voltage divider network between the voltage supply $+V$ and ground. The voltage level $+V$ and the values of resistors $R_1$, $R_2$, $R_3$ and $R_4$ are known. The voltage $+V$ and the values of resistances $R_1$ and $R_2$ readily yield the voltage level at the junction point 52 between those resistors $R_1$ and $R_2$. This voltage level is connected to the positive input terminal (+) of a comparator amplifier 54 which has a resistor $R_5$ connected in its feedback path in a known manner. The voltage level at the junction point 56 between resistors $R_3$ and $R_4+R_c$ will depend upon the value of $R_c$, since the values of $R_3$ and $R_4$ and the voltage level $V$ are fixed.

Comparator amplifier 54 operates in a well-known manner to produce a positive output signal when the magnitude of the voltage on the input terminal (+) exceeds the magnitude of the voltage on the input terminal (−). Likewise, comparator amplifier 54 produces a negative output signal when the magnitude of the voltage level at input terminal (−) exceeds the magnitude of the voltage level at input terminal (+).

If a conductive probe cover is not positioned on the instrument, $R_c$ will be a substantially infinite resistance, and the voltage level at junction point 56 will be approximately that of the voltage supply level (+V), while the voltage level at junction point 52 will be at a lower magnitude, thereby causing the comparator amplifier 54 to produce a negative output signal. If a conductive probe cover is properly positioned on the instrument, resistance $R_c$ will be substantially lower than infinity, thereby lowering the voltage at junction point 56 by the voltage drop across $R_3$ ($IR_3$). The values of $R_1$, $R_2$, $R_3$, $R_4$ and $R_c$ may be selected such that when a probe cover of known resistance is properly placed on the instrument, the voltage level at junction point 56 is lower than that at 52, thereby causing amplifier 54 to produce a positive output voltage on line 58. The positive output signal on line 58 may be utilized directly to enable the control circuitry of the electronic thermometer, as by an electrical switch responsive to a positive gating voltage (on line 58) operatively connecting the power supply to the control circuit. Accordingly, the top portion of the circuit in FIG. 2 produces a positive output signal when the magnitude of the resistance $R_c$ is below a given ohmic value.

The remaining portion of the circuit in FIG. 2, in the lower portion thereof, is added to ensure that the magnitude of the measured resistance $R_c$ is not lower than a predetermined low ohmic value. The upper and lower portions of the circuit operate together to ensure that the magnitude of the measured resistance is below a predetermined value (as measured by the upper portion of the circuit), and is above a predetermined value (as measured by the lower portion of the circuit). Accordingly the upper and lower portions operate together to ensure that the magnitude of the measured resistance is in a selected ohmic range between predetermined upper and lower ohmic values.

The circuit in the lower portion of FIG. 2 operates in a manner similar to that of the circuit already explained. Resistors $R_3'$ and $R_4'$ are positioned in a voltage divider network between a known voltage $+V$ and ground, thereby yielding a known voltage at junction point 60 which is directed to the negative input terminal $(-)$ of a comparator amplifier 54'. A second voltage divider network is formed by the combination of resistors $R_1'$ and $R_2'+R_c'$, with the voltage at the junction point 64 between resistors $R_1'$ and $R_2'$ being directed to the positive input terminal $(+)$ of comparator amplifier 54'. The values of resistors $R_1'$, $R_2'$, $R_3'$ and $R_4'$ are selected for an expected value for $R_c$ such that comparator amplifier 54' produces a positive output voltage when resistance $R_c$ is above a predetermined minimum ohmic value. If $R_c$ falls below that minimum value, the voltage level at junction point 64 will drop below the voltage level of junction point 60, thereby causing comparator 54' to produce a negative output signal on line 58'. Comparator 54' produces a positive output signal when the magnitude of $R_c$ is above the minimum value.

If the resistance of $R_c$ is between the upper and lower ohmic limits defined respectively by the upper and lower portions of the circuit, then comparator amplifier 54 produces a positive output signal on line 58 and comparator amplifier 54' produces a positive output signal on line 58'. Both of these signals may be ANDED in AND gate 66 to yield one enabling output signal on line 68.

The circuit of FIG. 2 also provides a static discharge system for a conductive probe cover positioned on the instrument as the cover is connected to ground by one of its contacts. The connection to ground provides for the conduction of static electrical charges from the probe cover at all times, an important consideration in some environments, such as a hospital operating room.

In accordance with the teachings of the present invention, the probe cover may be formed of a relatively thin layer of synthetic resin material such as polypropylene or polyethylene, having a conductive material such as carbon or metallic oxide dispersed therein to render the cover electrically conductive. In alternative embodiments of the present invention, a powdered metal or conductive paste, of the type utilized to manufacture integrated circuits and printed circuit boards, may be mixed with a synthetic resin material to form the conductive probe cover. Conductive materials which are suitable to render the probe cover conductive are available from Cominco American Inc. and also from Materials Research Corporation. Alternatively, graphite may be added to the synthetic resin to render the probe cover conductive.

Figure 5:
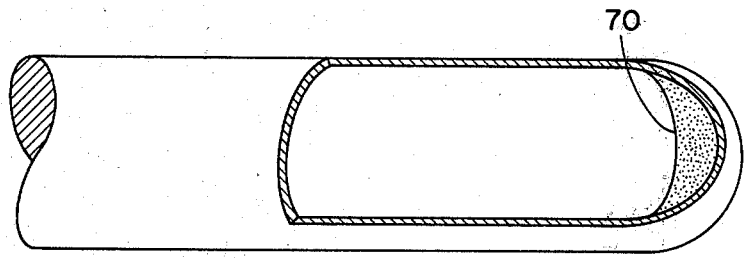
FIG. 5 is an enlarged, partially sectional view of the sensing end of a probe cover modified pursuant to the teachings herein.

FIG. 5 illustrates a partially broken away view of the sensing end of a probe cover modified in a manner to provide better thermal conductivity between the probe cover and the sensing thermistor. As illustrated, the inside tip of the probe cover may be covered with a thermal and electrically conductive metal film 70 deposited therein. The metal film 70 may also serve as one of the contacts cooperating with a verification circuit.

Figure 6:
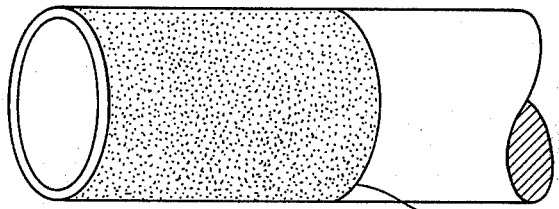
FIG. 6 is an enlarged view of an open end of a probe cover which is provided with a ring of reinforcing material encircling the opening to provide for more secure retention of the cover in a proper position over a probe.

FIG. 6 illustrates yet another embodiment of the present invention wherein an annular ring 72 of reinforcing material, such as a metallic film, is provided encircling the open end of the probe cover. The reinforcing material is provided to increase the physical strength of the cover at that location to provide an improved retention capability of the probe cover on the instrument. It has been found in practice that in some instances the open end of a cover has expanded beyond its elastic memory point, or the manufacturing tolerance of the inner diameter of the cover was not within product specifications. A ring of reinforcing material may be provided either externally or internally of the cover resin material to rectify those problems and may also serve as one contact for a verification circuit.

While several embodiments and variations of improved probe covers and electronic thermometers are disclosed herein, it may be appreciated that the disclosure and teachings herein will lead one of ordinary skill in this art to still other alternative embodiments and variations.

What is claimed is:

1. A protective probe cover, for a sensor probe component of an electronic thermometer, having an improved design to ensure that the probe cover is properly fitted onto the probe of the electronic thermometer, the electronic thermometer including a verification circuit for electrically ascertaining that the probe cover is properly fitted onto the probe, said probe cover being formed of a relatively thin layer of synthetic resin material, said synthetic resin material having a conductive material therein to render the probe cover electrically conductive to allow the verification circuit to conductively ascertain that the probe cover is properly positioned on the probe, said probe and said probe cover forming a resistive path having a predetermined resistance when said probe cover is properly fitted on said probe, wherein said verification circuit comprises means connected to said probe and probe cover for comparing the resistance of said resistive path to at least one predetermined resistance value and operative when the predetermined resistance of said resistive path is below the predetermined resistance value, and means responsive to operation of said operative means for enabling the electronic thermometer to respond to the temperature of its sensor probe.

2. The protective probe cover as claimed in claim 1, said conductive material being added to the synthetic resin forming the probe cover at a predetermined density to provide the probe cover with a given resistance value.

3. The probe cover as claimed in claim 1, said probe cover having an opening at one end to provide for insertion of the probe into the probe cover, and a ring of reinforcing material provided encircling said opening of said probe cover to more securely retain the probe cover in a proper position on the probe.

4. A protective probe cover, for a sensor probe component of an electronic thermometer, having an improved design to ensure that the probe cover is properly fitted onto the probe of the electronic thermometer, said electronic thermometer including a verification circuit adapted to respond to the connection thereto of a conductive probe cover when the probe cover is properly fitted onto the probe, said probe cover being electrically conductive and connected to said verification circuit to allow the verification circuit to conductively ascertain that the probe cover is properly positioned on the probe, said probe cover having an opening at one end to provide for insertion of the probe into the probe cover and retention of the probe cover in a proper position on the probe, and a ring of reinforcing material encircling said opening of said probe cover to more securely retain the probe cover in a proper position on the probe.

5. An improved design for a protective probe cover as claimed in claim 4, said reinforcing ring being formed of metal.

6. An improved design for a protective probe cover as claimed in claim 4, said probe cover being formed of a relatively thin layer of synthetic resin material having a conductive material therein, whereby to render the probe cover electrically conductive.

7. A combination of an electronic thermometer, having a probe which is adapted to be inserted into a cavity of a patient to electronically take a temperature measurement, and a protective probe cover for the probe, wherein said electronic thermometer includes verification circuit means for enabling the thermometer to operate properly only when the probe cover is properly positioned on the probe, said probe cover having electrically conductive portions formed as an integral part thereof to enable said verification circuit means to ascertain that the probe cover is properly positioned on the probe, said probe and said probe cover forming a resistive path having a predetermined resistance when said probe cover is properly fitted on said probe, wherein said verification circuit comprises means connected to said probe and probe cover for comparing the resistance of said resistive path to at least one predetermined resistance value and operative when the predetermined resistance of said resistive path is below the predetermined resistance value, and means responsive to the operation of said operative means for enabling the electronic thermometer to respond to the temperature of its probe.

8. The combination as claimed in claim 7, said probe cover having an opening at one end to provide for insertion of the probe into the cover, and a ring of reinforcing material provided encircling said opening of said probe cover to more securely retain the probe cover in a proper position on the probe.

9. The combination as claimed in claim 7, said probe cover being formed of a relatively thin layer of synthetic resin material having a conductive material therein to render the probe cover electrically conductive.

10. The combination as claimed in claim 9, said conductive material being added to the synthetic resin forming the probe cover at a predetermined density to provide a predetermined resistance for the probe cover.

11. The combination as claimed in claim 7, wherein said at least one predetermined resistance value comprises a given resistance value, said verification circuit means including means for enabling the thermometer to operate only when the measured resistance is below said predetermined resistance value.

12. The combination as claimed in claim 11, said verification circuit having means for electrically contacting the probe cover at each of its lengthwise ends, such that the resistive path being measured is along the length of the probe cover.

13. The combination as claimed in claim 7, wherein said at least one predetermined resistance value comprises predetermined upper and lower ohmic limits, said verification circuit having means for enabling the thermometer to operate properly only if the magnitude of the measured resistance is between said predetermined upper and lower ohmic limits.

14. A combination of an electronic thermometer, having a probe which is adapted to be inserted into a cavity of a patient to electronically take a temperature measurement, and a protective probe cover for the probe, with the combination providing for the discharge of static electrical charges from the cover, said protective probe cover having an improved design to ensure that the probe cover is properly fitted onto the probe of the electronic thermometer, said electronic thermometer including a verification circuit having contact means adapted to be engaged by said probe cover when it is properly fitted onto the probe, said probe cover being electrically conductive so that when it engages the aforesaid contact means the vertification circuit ascertains that the probe cover is properly fitted on the probe and provides for the discharge of static electricity therefrom, said electronic thermometer having a grounding electrical contact connected to said verification circuit for discharging static electricity from said probe cover to ground.

15. The combination as claimed in claim 14, said probe cover being formed of a relatively thin layer of synthetic material having a conductive material therein to render the probe cover electrically conductive.

16. In an electronic thermometer having a probe and a probe cover, said probe being adapted to be inserted into a cavity of a patient to electronically take a temperature measurement, the improvement comprising a verification circuit for determining when the probe cover is properly positioned on the probe, said probe and said probe cover forming a resistive path having a predetermined resistance when said probe cover is properly positioned on said probe, when said vertification circuit comprises means connected to said probe and probe cover for comparing the resistance of said resistive path to at least one predetermined resistance value and operative when the predetermined resistance of said resistive path is below the predetermined resistance value, and means responsive to operation of said operative means for enabling the electronic thermometer to respond to the temperature of its probe.

17. In an electronic thermometer as claimed in claim 16, wherein said at least one predetermined resistance value comprises a given resistance value, said verification circuit having means for enabling the thermometer to operate only when the measured resistance is below said given predetermined resistance value.

18. In an improved electronic thermometer as claimed in claim 17, said verification circuit having means to electrically contact the probe cover at each of its lengthwise ends, such that the resistive path being measured is along the length of the probe cover.

19. In an improved electronic thermometer as claimed in claim 16, wherein said at least one predetermined resistance value comprises predetermined upper and lower ohmic limits, said verification circuit having means for enabling the thermometer to operate properly only if the measured resistance is between predetermined upper and lower ohmic limits.

* * * * *

UNITED STATES PATENT AND TRADEMARK OFFICE
CERTIFICATE OF CORRECTION

PATENT NO. : 4,341,992
DATED : July 27, 1982
INVENTOR(S) : HAROLD GOLDSTEIN

It is certified that error appears in the above-identified patent and that said Letters Patent are hereby corrected as shown below:

Claim 16, line 9 change "when" to --wherein--.

Signed and Sealed this

Twenty-sixth Day of October 1982

[SEAL]

Attest:

GERALD J. MOSSINGHOFF

Attesting Officer

Commissioner of Patents and Trademarks